United States Patent
Gregg et al.

(10) Patent No.: US 8,458,396 B2
(45) Date of Patent: Jun. 4, 2013

(54) SHARING RESOURCES WITHIN A ROBOTIC MEDIA LIBRARY AMONGST A PLURALITY OF CONNECTED SERVERS

(75) Inventors: Leon E. Gregg, Rochester, MN (US); Ellen M. Stacey, Rochester, MN (US); James L. Tilbury, Rochester, MN (US); Richard L. Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 12/048,454

(22) Filed: Mar. 14, 2008

(65) Prior Publication Data

US 2009/0235031 A1    Sep. 17, 2009

(51) Int. Cl.
*G06F 12/00* (2006.01)

(52) U.S. Cl.
USPC .............. 711/112; 711/4; 711/141; 709/248

(58) Field of Classification Search
USPC ................. 711/4, 112, 141; 709/248
See application file for complete search history.

(56) References Cited

U.S. PATENT DOCUMENTS

| | | | |
|---|---|---|---|
| 6,336,172 B1 * | 1/2002 | Day et al. | 711/161 |
| 6,779,058 B2 * | 8/2004 | Kishi et al. | 710/60 |
| 7,386,575 B2 * | 6/2008 | Bashant et al. | 1/1 |
| 7,424,583 B2 * | 9/2008 | Tsuboki et al. | 711/162 |

\* cited by examiner

*Primary Examiner* — Matthew Bradley
(74) *Attorney, Agent, or Firm* — James R. Nock (57) ABSTRACT

The present invention provides an apparatus, method, and computer program product for sharing resources within a robotic media library having multiple media types and multiple device types amongst a plurality of connected servers.

8 Claims, 5 Drawing Sheets

SHARING RESOURCES WITHIN A ROBOTIC MEDIA LIBRARY AMONGST A PLURALITY OF CONNECTED SERVERS

FIELD OF THE INVENTION

The present invention relates generally to the data processing field, and more particularly, related to a method, apparatus and computer program product for sharing resources within a robotic media library having multiple media types and multiple device types amongst a plurality of connected host servers.

BACKGROUND OF THE INVENTION

An automated storage library or robotic media library typically includes a plurality of storage slots and drives (collectively known as "elements") for retaining data storage media, such as magnetic tapes, magnetic disks, or optical disks, and includes a robotic picker mechanism for picking or gripping a cartridge containing a particular data storage medium (DSM) and moving the DSM between a storage slot and an input/output (I/O) drive. In a typical configuration, the media library is connected to one or more servers via a high speed interface (e.g., fibre channel).

In current systems, the sharing of hardware resources within the media library amongst a plurality of servers is accomplished in high-end tape libraries by designing an intelligent controller running the media library. While such a solution is functionally sound, it is a very expensive, sophisticated solution. In lower-end disk type media library systems, all data requests are directed to a single controlling host system, the controlling host system then effectively acting as a conduit to the media library. While such an approach is technically more simple and cost effective than designing a custom intelligent controller, it creates a bottleneck in the controlling host system, since the controlling host system must manage all requests to and from the media library from all requesting servers requiring access to the media library.

A need exists for a simple, high performance, cost effective mechanism/methodology for sharing resources within a robotic media library having multiple media types and multiple device types amongst a plurality of connected servers.

SUMMARY OF THE INVENTION

The present invention provides a method, apparatus and computer program product for sharing resources within a robotic media library having multiple media types and multiple device types amongst a plurality of connected host servers.

In one embodiment of the present invention, an apparatus is provided for sharing a plurality of media elements within a media library. In this embodiment, the media library is coupled to a plurality of media servers. The apparatus includes a status information table residing within a storage area of the media library for maintaining server status information on each of the plurality of media elements. The apparatus also includes a cache data synchronization field residing within the storage area of the media library for maintaining cache coherency information between the media library and the plurality of host servers. When one of the plurality host servers wishes to access a particular media element within the media library, the requesting host server checks the status information table in the media library in order to determine whether access to the particular requested media element should be granted and also checks the cache data synchronization field to determine if any cached data from the media library can be trusted.

In one embodiment, the status information table includes a plurality of row entries, each of the plurality of row entries corresponding to a media element chosen from the plurality of media elements, and column entries comprising an owning system identifier, a using system identifier, and a requesting system identifier. In one embodiment, the cache data synchronization field comprises a plurality of bits, each bit corresponding to one of the plurality of host servers. In one embodiment, an atomic access command such as a Small Computer System Interface (SCSI) "reserve" command is issued from the requesting server to the media library when the requesting host server wishes to access a media element within the media library, and an atomic access command such as a SCSI "release" command is issued from the requesting host server to the media library when the requesting host server completes its access to a media element within the media library. In one embodiment, the network connection between the plurality of host servers and the media library is fibre channel, and the media elements comprise magnetic tapes, magnetic disks, and optical disks.

In one embodiment a priority is assigned to each of the plurality of host servers, wherein if the requesting host server has a higher priority than the host server currently residing in the requesting system identifier field for the requested media element, an identifier associated with the requesting host server replaces an identifier associated with the host server currently residing in the requesting system identifier field of the status information table. In one embodiment, the assignment of priority is controlled by a host server chosen from the plurality of host servers, and, in one instance, may be provided by a round robin assignment scheme.

The present invention further provides a method for sharing a plurality of media elements within a media library, the media library coupled to a plurality of host servers. The method begins by establishing a storage area within the media library for maintaining server status information on each of the plurality of media elements via a status information table. Next, access to a requested media element is requested within the plurality of media elements in the media library via a requesting host server. Next, the status information table within the storage area is checked to determine if the requesting host server has authority to immediately access the requested media element. If the requesting host server has immediate access authority to access the requested media element, the status information table is updated, then authority for the requesting host server to access the requested media element is granted. Otherwise, if the requesting host server does not have immediate access authority to access the requested media element, the status information table is updated, then access to the requested media element is retried.

BRIEF DESCRIPTION OF THE DRAWINGS

Various embodiments of the present invention are hereafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

The present invention will now be described in detail with reference to the drawings. Embodiments described below are not meant to limit the scope of the invention in the claims, and not all combinations of features described in the embodiments are essential to solving means of the invention. The same elements are given the same reference numerals throughout the description of the embodiments.

Figure 1:
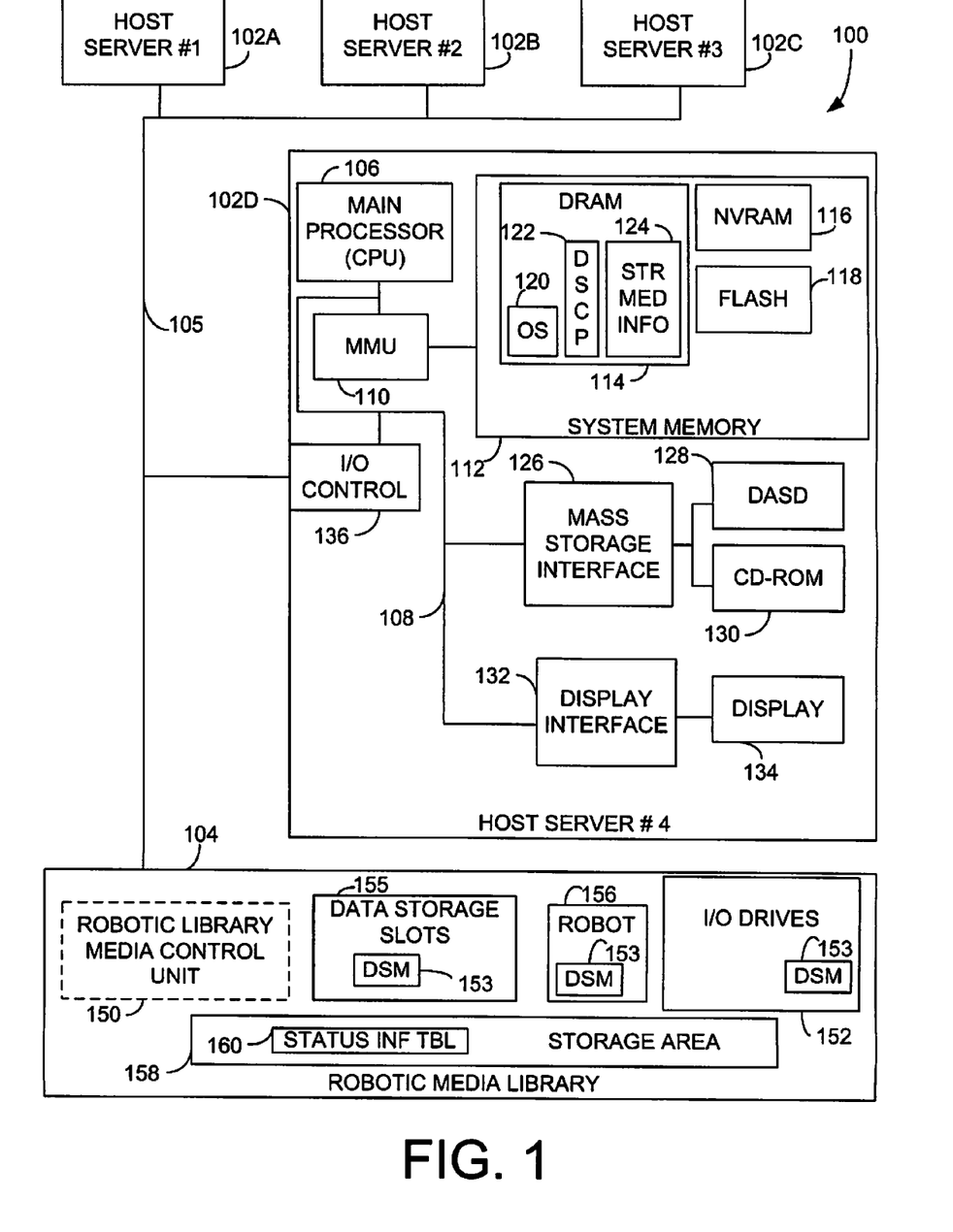
FIG. 1 illustrates a high level block diagram representation of multiple host servers connected to each other and a media library via a network.

Referring now to the Drawings, FIG. 1 depicts a high-level block diagram representation of multiple computer servers (i.e., "host servers") 102A-102D, hereinafter collectively referred to as 102 connected to each other and a robotic media library 104 via a network 105, shown generally at 100, according to an embodiment of the present invention. The term "server" is used herein for a convenience only, and in various embodiments a computer system that operates as a client in one environment may operate as a server in another environment, and vice versa. In an embodiment, the hardware components of the host servers 102 may be implemented by IBM System i™ computer systems available from International Business Machines Corporation of Armonk, N.Y. But those skilled in the art will appreciate that the mechanisms and apparatus of the embodiments of the present invention apply equally to any appropriate computing system.

Host server 102 includes one or more general-purpose programmable central processing units (CPUs) 106 coupled by a system bus 108 to a memory management unit (MMU) 110 and a system memory 112. Each CPU 106 executes instructions stored in the system memory 112 and may include one or more levels of on-board cache.

The system memory typically includes dynamic random access memory (DRAM) 114, a nonvolatile random access memory (NVRAM) 116, and/or a flash memory 118, to store or encode data and programs. In another embodiment, the system memory 112 represents the entire virtual memory of the host server 102, and also includes the virtual memory of other host servers coupled to the host server 102 or connected via network 105. The system memory 112 is conceptually a single monolithic entity, but in other embodiments the system memory 112 is a more complex arrangement, such as a hierarchy of caches and other memory devices.

System memory 112 includes an operating system 120, and a device selection control program 122. Operating system 120 is the software that manages the sharing of the resources of a host server 102 and provides programmers with an interface used to access those resources. In one embodiment, system memory 112 further includes stored media information 124 relating to the media existing within an attached media library 104. The device selection control program 122 utilizes the stored media information 124 to access elements within the media library 104.

A mass storage interface 126 coupled to a system bus 108 connects a direct access storage device (DASD) 128 and a CD-ROM drive 130 to the main processor 106. Host server 102 includes a display interface 132 connected to a display 134 and the system bus 108, and an input/output (I/O) control 136 is also coupled to the system bus 108.

Robotic media library 104 is coupled to the I/O control 136 of each of the plurality of host servers 102 via network 105. In one embodiment, the robotic media library 104 may include a robotic media control unit 150 for controlling at least some operations in the media library 104. In another embodiment of the present invention, the robotic media control unit 150 is not required. Instead, in this embodiment, operations within the media library are controlled directly by host server 102. The term "controlling operations in the media library 104" typically includes managing the reading and writing onto a data storage medium (DSM) 153 residing in a selected one of a plurality of I/O drives 152 to and from a host server 102, and further managing a robot 156 which moves the DSMs 153 between a plurality of data storage slot elements 155 and a plurality of I/O drive elements 152. The DSMs 153 residing within the data storage slot elements 155, the robot 156 and the I/O drive elements 152 typically include, but are not limited to, magnetic tapes, magnetic disks, and/or optical disks.

In accordance with the present invention, robotic media library 104 includes a storage area 158 for maintaining status information for multiple host servers 102 sharing resources within the media library 104. In one embodiment of the present invention, storage area 158 includes a status information table 160, which contains status/usage information for each data storage slot element 155 or I/O drive element 157, hereinafter collectively referred to as "elements" residing within the media library 104. The specific information maintained within status information table 160 is discussed more specifically with reference to FIG. 2. The status information table 160 can be written to and read by a plurality of host servers 102 requesting access to a specific resource contained within the media library 104.

When a host server 102 wishes to access a resource within the media library 104, the host server issues a request via an atomic access command, such as a SCSI "reserve" command to the robotic media library 104. The use of a SCSI "reserve" command enables atomic access (i.e., one host server 102 at a time) and updates to the information contained within the status information table 160. For each request received, the status information table 160 is checked, and if necessary, modified, before the requested operation is allowed within the media library 104. The status received from the status information table 160 indicates whether the requested operation may proceed immediately, or whether the operation must be delayed because of another operation currently underway with another host server 102.

The network 105 may be any suitable network or combination of networks and may support any appropriate protocol suitable for communication of data and/or code to/from/between host servers 102 and media library 104. In one embodiment, the network 105 is a Fibre Channel network implementing the SCSI interface protocol. In an embodiment, the network 105 may support the Infinband architecture. In another embodiment, the network 105 may support wireless communications. In another embodiment, the network 105 may support hard-wired communications, such as telephone line or cable. In another embodiment, the network 105 may support the Ethernet IEEE (Institute of Electrical and Electronics Engineers) 802.3x specification. In another embodiment the network 105 may be in the Internet and may support IP (Internet Protocol). In another embodiment the network 105 may be a local area network (LAN), a wide area network (WAN), or a storage area network (SAN). In another embodiment, the network 105 may be an intranet. In still another embodiment, the network 105 may be any suitable network or combination of networks. Although one network 105 is shown, in other embodiments any number of networks (of the same or different types) may be present.

It should be understood that FIG. 1 is intended to depict the representative major components of the host servers 102 and the media library 104 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc. and are referred to hereinafter as "computer programs," or simply "programs." The computer programs typically comprise one or more instructions that are resident at various times in various memory 112 and storage devices 128, 130 in the host server 102, and that, when read and executed by one or more processors 106 in the host server 102, cause the host server 102 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the host servers 102 via a variety of tangible signal-bearing media that may be operatively or communicatively connected (directly or indirectly) to the processor or processors, such as processor 106. The signal-bearing media may include, but are not limited to:

(1) information permanently stored on the non-rewriteable storage medium, e.g., a read-only memory device attached to/within a host server, such as a CD-ROM readable by a CD-ROM drive 130;
(2) alterable information stored on a rewriteable storage medium, e.g., a hard disk drive (e.g., DASD 128), the system memory 112, CD-RW, or diskette; or
(3) information conveyed to the host server 102 by a communications medium, such as through a computer or a telephone network; e.g., the network 105.

Such tangible signal-bearing media, when encoded with or carrying computer-readable and executable instructions that direct the functions of the present invention, represent embodiments of the present invention.

Figure 2:
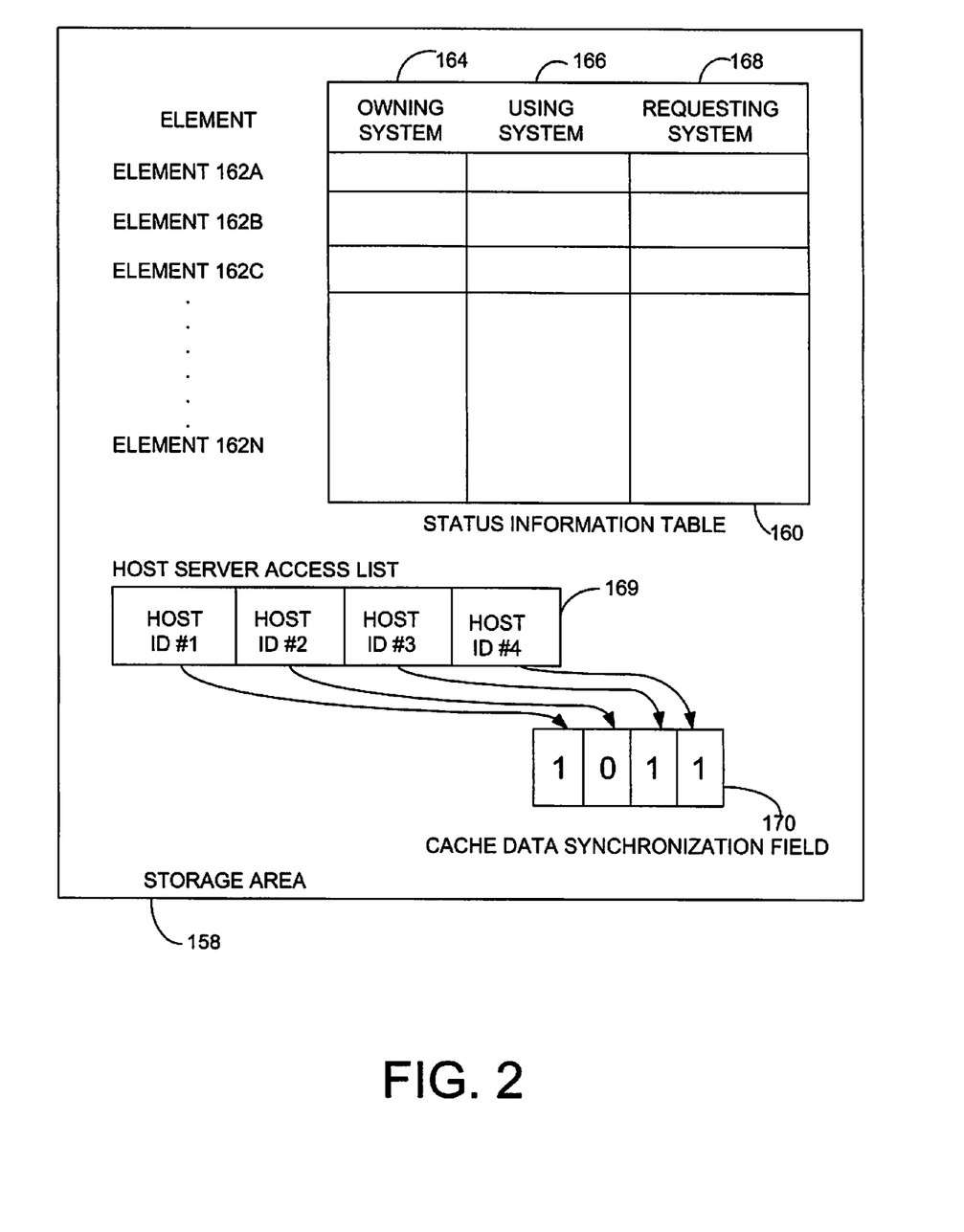
FIG. 2 illustrates in more detail the status information table previously shown in FIG. 1.

FIG. 2 illustrates the status information table 160 previously introduced in FIG. 1. Each row entry 162A, 162B, 162C, and 162N, collectively referred to as 162, within the status information table 160 corresponds to a data storage slot 155 or an I/O drive 152, hereinafter collectively referred to as "elements", residing within media library 104. Status information table 160 also has columns corresponding to an owning system 164, a using system 166, and a requesting system 168. Storage area 158 further includes a host server access list 169, and an N-bit cache data synchronization field 170, which is a bit mask representing whether a cache data synchronization operation is required, described in more detail below.

The "owning system" column 164 within the status information table 160 contains an identifier associated with a host server 102 which currently "owns" a particular element (e.g., data storage slots 155 and media drives 152) within the media library 104. When host server 102 needs to control or reserve an element in the media library 104, the host server 102 stores its identifier within column 164 of the element's entry in the status information table 160 as the "owning system". As long as this particular host server 102 is indicated as "owning" a particular element, another host server 102 is not allowed to access the owned element. "Ownership" is typically long-term and is used to permanently allocate library resources to one host server 102.

The "owning system" column 164 within a status information table element entry 162 thus enables a single host server 102 to exclusively reserve the use of an element within the media library 104. This gives control over the number of DSMs 153 any host server 102 can add to the system. This has two main purposes: 1) this guarantees that a particular host server 102 will be allowed to add a specified number of DSMs 153; 2) this also means that no host server 102 can be allowed to take over or monopolize the elements since even if the media library 104 as a whole might have unused elements, one host server 102 might not be allowed to add more media because all of the unused elements are assigned to another host server 102.

The "using system" column 166 within the status information table 160 contains an identifier associated with the host server 102 which currently is "using" an element. When host server 102 is temporarily using an element in the media library 104, the host server 102 stores its identifier within column 166 as the "using system". Typically, while "ownership" is a long term operation, "using" is a temporary/transient usage of a particular element. Each host server 102 request that "uses" an element stores the identifier associated with the requesting host server 102 in the "using system" column 166 for the requested element, then clears any host server identifier present within the "requesting system" column 168 for the requested element.

The "requesting system" column 168 within the status information table 160 contains an identifier associated with a host server 102 which would like to "use" an element within the media library 104. When a host server 102 wants to use an element which is already indicated as being in use (i.e., there is an identifier associated with another host server in the "using system" column 166 for the element), the requesting host server 102 then stores its identifier in the "requesting system" column 168 of the requested element entry 162 (as long as the "requesting system" column 168 is currently null, or the priority of the currently requesting host server is higher than the priority of any host server identifier shown in the "requesting system" column 168). Each time the "using system" references the element, the "requesting system" column 168 of element entry row 162 corresponding to the element 152 is cleared. When a host server 102 requests use of an element, it repeatedly checks, delays, then re-checks the "requesting system" column 168 for the requested element 152. If a requesting host server 102 repeatedly checks for resource availability and finds that the "requesting system" identifier continues to be unchanged for a predetermined period of time, this is an indication that the host server 102 currently indicated as using the element has either crashed or become unavailable, and that a recovery action is needed.

The host server access list 169 is a simple list of host systems authorized to access and use the media library 104. The host server access list has a positional significance which defines a "host number" for each host server using the media library 104. The first host id in the list is known as host 1, the second host id in the list is known as host 2, etc.

In one embodiment, host ids in this list are worldwide unique IDs. The ordinal host number 1, 2, etc. is the enumeration of the bit position in the data synchronization field associated with the particular host server. Thus, if a host id appears in position 4 of the host server access list 169 (i.e., in this instance, host id #4), then this host id corresponds to bit 4 in the cache data synchronization field 170.

The cache data synchronization field 170 may be incorporated as part of the status information table 160, or may be located elsewhere in the storage area 158 of the media library 104. The cache data synchronization field 170 is a bit mask where each host server 102 which has access to the media library 104 is represented by one bit within the field. When any host server 102 updates data that might be cached by another host server, then all the bits in this field—except the bit corresponding to the updating host server 102—are set to one. This is an indicator to all other host servers 102 that any cached data should not be trusted. When another host server 102 refreshes any cached data, it can then set its corresponding bit in the cache data synchronization field 170 to zero, indicating that it is again in synchronization and any cached data can again be used. Multiple host servers 102 can continue to use cached data until one of them performs an update—at which time the flags are again set to one, indicating that cached data should not be used.

With the addition of the information in the status information table 160, the host server access list 169 and the cache data synchronization field 170, the elements within the media library 104 may now be shared with cooperating host servers 102.

Figure 3:
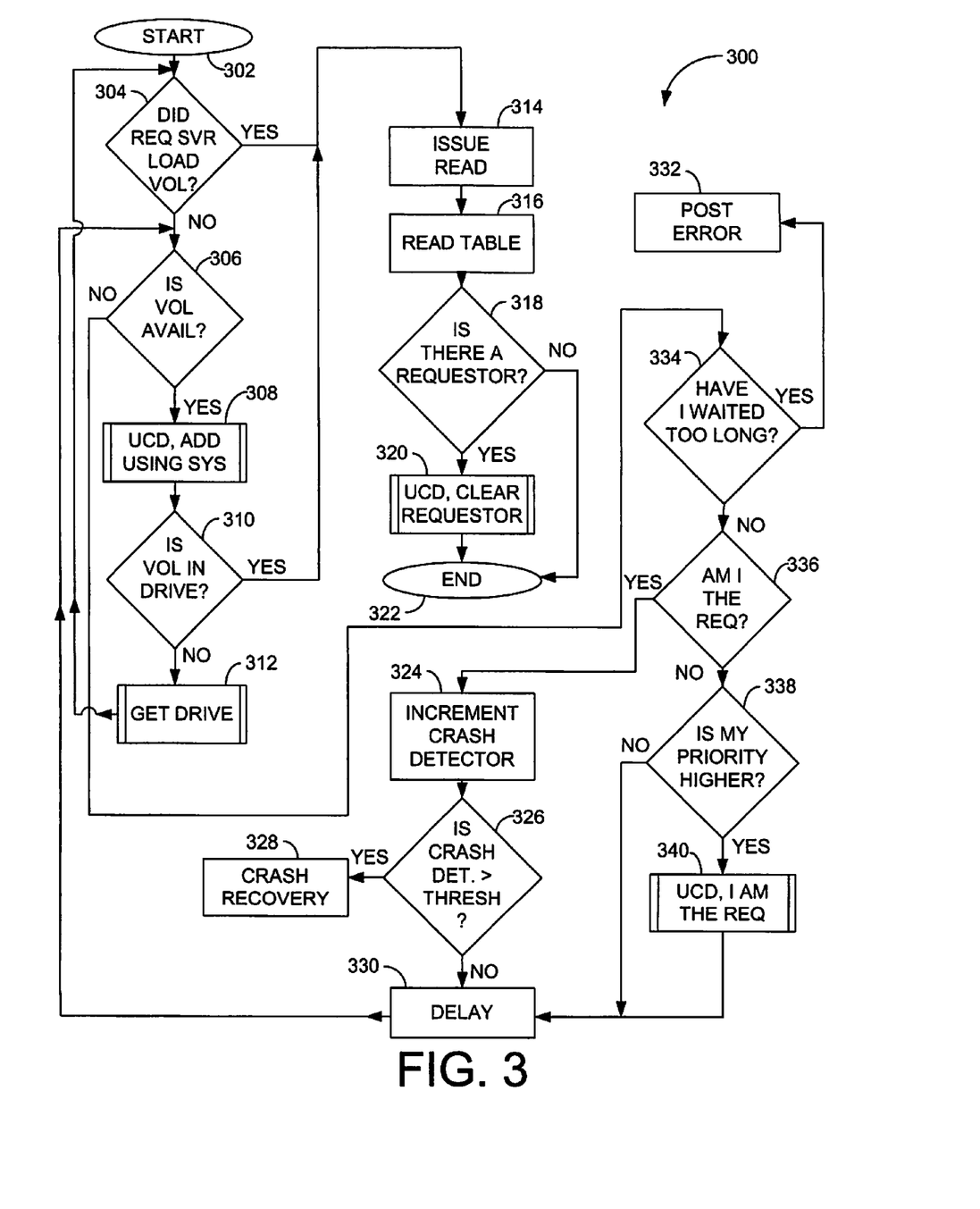
FIG. 3 illustrates a simplified flow diagram for a read request from a host server to read data from a specific I/O drive within the media library.

FIG. 3 illustrates a simplified flow diagram 300 for a simple request from a host server 102 to read data from a DSM 153 within the media library 104. There are several issues that must be dealt while servicing even such a simple request: 1) is the requested DSM 153 in a data storage slot 155 or I/O drive 152 right now?; 2) if the requested DSM 153 is in an I/O drive 152, did the requesting host server 102 put it here, or did another host server?; 3) if the requested DSM 153 is in an I/O drive 152, has it already been there too long (i.e., it is necessary to limit the amount of time a specified DSM 153 stays in an I/O drive so that I/O operations to one DSM 153 does not block other requests indefinitely?; and 4) if the requested DSM 153 is not in an I/O drive 152, is an I/O drive available now or is it necessary to wait a while?

Figure 4:
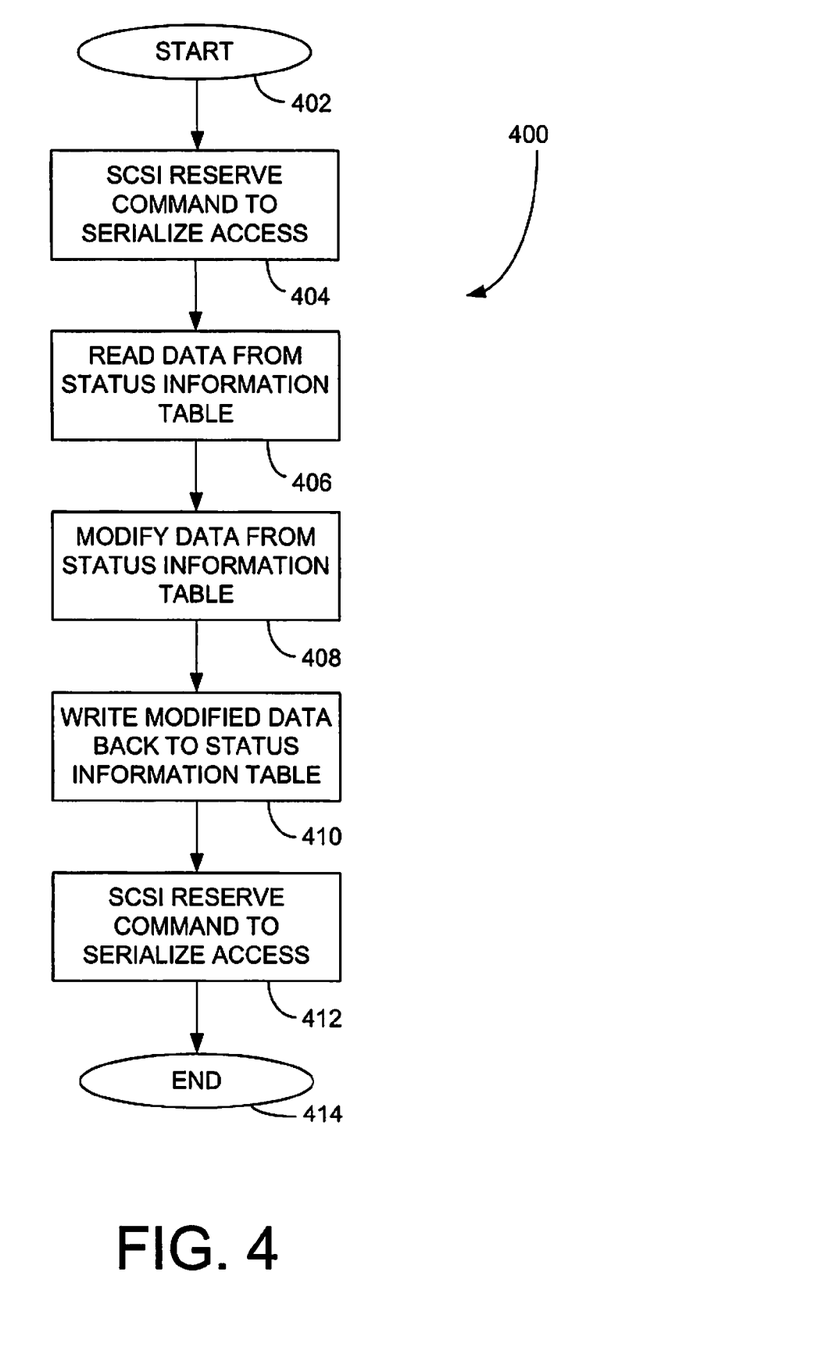
FIG. 4 is a flowchart illustrating the "Update the Configuration Data" or UCD routine called by FIGS. 3 & 5.

The flow diagram for the simplified read operation begins at step 302. At block 304, it is determined if the requesting host system 102 has previously loaded the requested DSM 153. If so, control passes to block 314 where a read is issued to the appropriate I/O drive 152 containing the requested DSM 153. If the requesting host system 102 has not previously loaded the requested DSM 153, control passes to block 306, where it is determined if the requested DSM 153 is currently available to the requesting host server 102. If not, control passes to block 334. If so, control passes to block 308 where an "Update the Configuration Data" (UCD) routine shown in FIG. 4 is executed, and the "using system" entry within the status information table 160 is updated to reflect the identifier associated with the requesting host server 102. Control then passes to block 310, where it is determined whether the requested DSM 153 is currently in an I/O drive 152 within the media library 104. If not, control passes to block 312, where a "GET DRIVE" routine is called (shown in FIG. 5). If the requested DSM 153 is in an I/O drive 152 within the media library 104, control passes to block 314 where a read is issued to the appropriate I/O drive 152 containing the requested DSM 153. Next, at block 316, the status information table 160 is read to determine the status of the requested I/O drive 152. At block 318, it is determined whether there is a host server identifier present within the "requesting system" column 168 of element entry row 162 within the status information table 160 for the accessed I/O drive. If not, the operation terminates, as shown at block 322. If there is a host server identifier present within the "requesting system" field, control passes to block 320, where the "update the configuration data" (UCD) routine is called (shown in FIG. 4), and the "requesting system" column 168 for the accessed element entry row 162 is cleared. Next, at block 322, the read operation terminates.

If the requested DSM 153 is indicated as unavailable (previously shown as block 306), control passes to block 334, where it is determined if the requesting host server 102 has waited too long (i.e., typically determined by assigning a predetermined wait time) for its request to be fulfilled. If so, control passes to block 322, where an error is posted, and the read operation terminates. If the predetermined wait time has not been exceeded, control passes to block 336, where it is determined whether the requesting host server 102 identifier is indicated as the "requesting system" indicated within the status information table 160 for the requested I/O drive 152. If not, control passes to block 338, where it is determined whether a priority value assigned to the requesting host server 102 is higher than a priority value assigned to the host server indicated currently as the "requesting system". The priority may be pre-assigned to the host servers 102, or assigned "on the fly" by a scheme, such as a "round-robin" type scheme. If the requesting host server 102 has a higher priority than the current "requesting system" server, control passes to block 340, where the "Update the Configuration Data" (UCD) routine is called (shown in FIG. 4), and the "requesting system" column 168 of element entry row 162 for the accessed I/O drive 152 is updated to now reflect the identifier associated with the requesting host server 102. Control then passes to delay block 330, where the request for access is delayed by a predefined time period. Once the predefined time period has passed, control passes to block 306, where it is once again determined whether the requested DSM 153 available. If the requesting host server 102 does not have a higher priority than the current "requesting system" server, control passes directly to delay block 330, bypassing block 340.

If, at block 336, it is determined that the requesting host server 102 is the "requesting system" indicated in the status information table 160 for the given I/O drive 152, control passes to block 324, where a crash detector counter is incremented. Control then passes to block 326, where it determines whether the crash detector counter has reached a predetermined threshold. If so, control passes to block 328, where a crash recovery process is initiated, and the read operation is terminated. If the crash detector counter has not reached the crash detector threshold, control passes to delay block 330, prior to once again determining whether the volume is available at block 306. In an alternate embodiment (not illustrated), the crash detector counter may not be required, instead a crash timer is utilized and checked at block 326.

Figure 5:
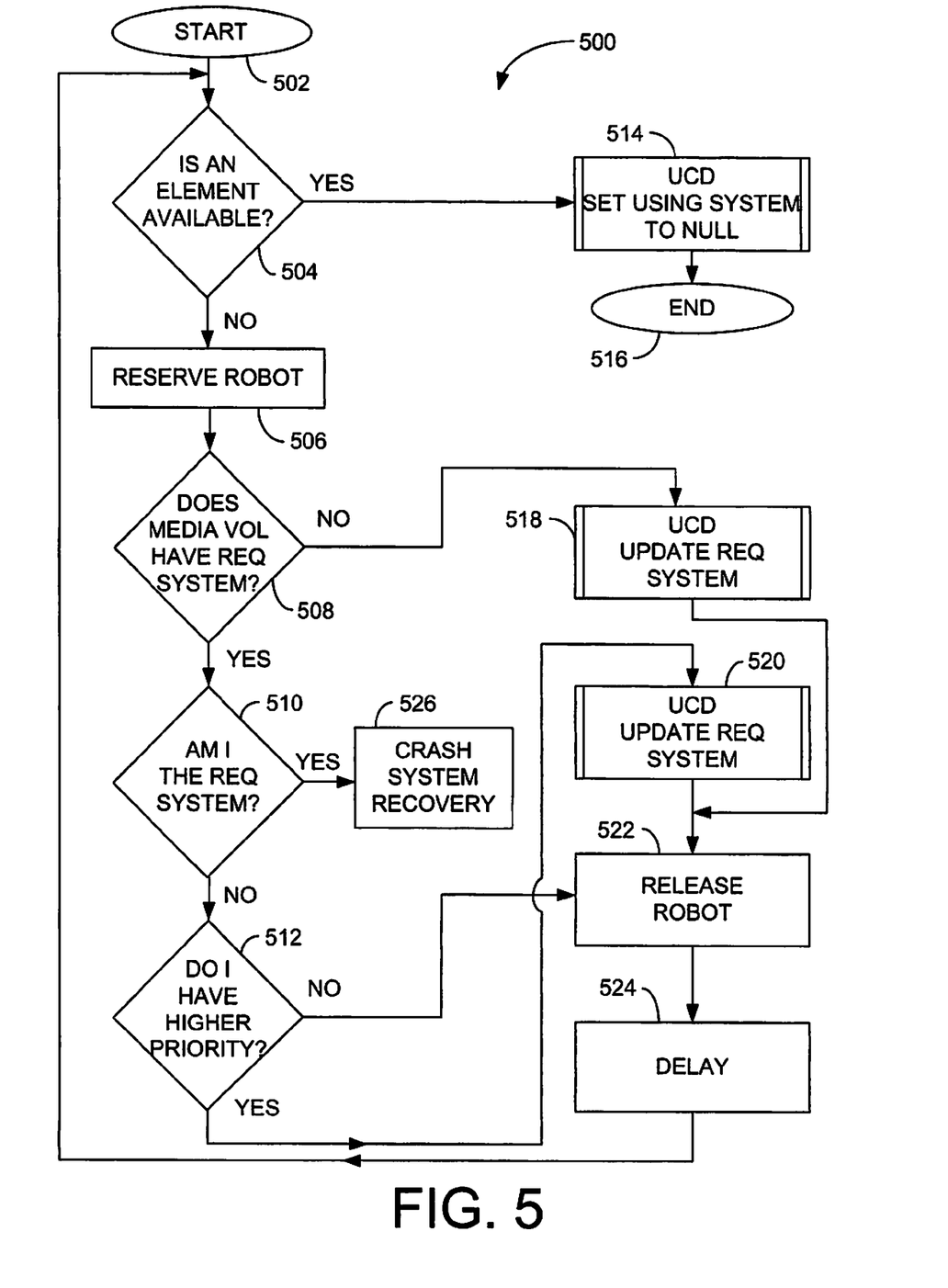
FIG. 5 illustrates the "Get Drive" routine called by the read request shown in FIG. 3.

FIG. 4 is a flowchart illustrating the "Update the Configuration Data" or UCD routine 400 called by the routines in FIG. 3 at element 308 and FIG. 5 at element 518 and 520. This routine enables a host server 102 to directly access and update status information table 160 for a specified operation. The basic operation of the UCD routine 400 is to enable a requesting host server 102 to update data within the status information table 160. The routine begins at block 402. Block 404 serializes access to the media library 104 via the SCSI "reserve" command (including a wait if the robot 156 is busy). Next, at block 406, data is read from the status information table 160. Control passes to block 408, where data within the status information table 160 is modified. Next, at block 410, the modified data is written back to the status information table 160. Control then passes to block 412, where the serialization operation is ended (via the SCSI "release" command). The UCD routine 400 terminates at block 414.

FIG. 5 is a flow diagram illustrating the "GET DRIVE" routine 500 called by the read request routine 300 previously illustrated in FIG. 3, block 312. The flow diagram begins at block 502. At block 504, it is determined if the I/O drive 152 requested by the requesting host server 102 is available. If I/O drive 152 is available, control passes to block 514, where a UCD operation shown in FIG. 4 is performed. The "Using System" column 166 of the element entry row 162 is set to the identifier associated with the requesting host server 102, and the "Requesting System" is set to NULL. The routine then ends at block 516.

If an I/O drive 152 is not available, control passes to block 506 where the robot 156 is reserved via the SCSI "reserve" command. Next, at block 508, it is determined if the requested element currently has an identifier for a "requesting system" stored in the status information table 160. If the "requesting system" column 168 of the requested element entry 162 within the status information table 160 is empty or null, the UCD routine shown in FIG. 4 is called, and the identifier associated with the requesting host server 102 is added to the "requesting system" column 168 of the requested element entry row 162 within the status information table 160 at block 518. Next, at block 522, the robot 156 is released via the SCSI "release" command. Control then passes to delay block 524 where the routine execution is delayed for a predetermined period of time, before returning to the top of the "GET DRIVE" routine at block 504.

If the requested element is determined to have an identifier for a "requesting system" stored in the status information table 160 at block 508, control passes to block 510 where it is determined whether the identifier for the "requesting system" from the previous step is the same as the identifier of the host server 102 currently issuing the request. If so, control passes to block 526 where a crashed system recovery is performed. If not, control passes to block 512, where it is determined whether a priority value assigned to the requesting host server 102 is higher than a priority value assigned to the host server indicated currently as the "requesting system" in the status information table 160. The priority may be pre-assigned to the host servers 102, or assigned "on the fly" by a scheme, such as a "round-robin" type scheme. If the requesting host server 102 has a higher priority than the current "requesting system" server, control passes to block 520, where the "update the configuration data" UCD routine is called (shown in FIG. 4), and the "requesting system" column 162 for the accessed element entry row 162 is updated to now reflect the identifier associated with the requesting host server 102. Control is then passed to block 522, where a SCSI command is issued to "release" the robot 156. Control then passes to block 524, where the flow is delayed for a predetermined time period prior to returning to block 504. If the requesting host server does not have a higher priority than the current "requesting system" server, control passes directly to block 522, where a SCSI command is issued to "release" the robot 156.

Crash detection and recovery, such as that described in block 526 of FIG. 5, and block 328 of FIG. 3 allows the media library to continue operation even if one, or even more, of the host servers 102 using the media 104 library should somehow crash or become non-responsive. If a requesting host server 102 has a volume in one of the elements 152 and then that requesting host server 102 just stops responding, it is not desirable to just leave the DSM 153 and element 152 in the media server 104 unusable forever. If a requestor discovers that they have been waiting for an inordinate amount of time with no I/O activity from the host server 102 using the DSM/element 152, then it is a reasonable assumption to assume the host server 102 has crashed. At this point, the recovery can be rather simple. It is only necessary to indicate that the cached data cannot be trusted (i.e., indicated via the cache data synchronization field 170), and assign the volume/drive to the requester. Additional actions such as logging the incident or other functions are possible, but not required for the correct operation of this design.

In the previous detailed description of exemplary embodiments of the invention, reference was made to the accompanying drawings (where like numbers represent like elements), which form a part hereof, and which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without those specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

The invention claimed is:

1. A method for sharing a plurality of media elements within a media library, the media library coupled to a plurality of host servers, comprising:
    establishing a storage area within the media library for maintaining server status information on each of the plurality of media elements via a status information table;
    requesting access to a requested media element within the plurality of media elements in the media library via a requesting host server;
    checking the status information table within the storage area to determine if the requesting host server has authority to immediately access the requested media element;
    if the requesting host server has immediate access authority to access the requested media element, updating the status information table, then granting authority for the requesting host server to access the requested media element; and
    if the requesting host server does not have immediate access authority to access the requested media element, updating the status information table, then periodically retrying access to the requested media element.

2. The method of claim 1, further comprising:
establishing a cache data synchronization field within the storage area, the cache data synchronization field comprising a plurality of bits, each bit corresponding to a potential requesting host server;
if the requesting host server updates information that is potentially cached by any of the other potential requesting host servers, then setting the bit mask for any of the other potential requesting host servers within the cache data synchronization field indicating that any cached data is not synchronized; and
if any of the other potential requesting host servers refreshes any cached data, then resetting the bit corresponding to the any other potential requesting host server within the cache data synchronization field, indicating that the data is once again synchronized.

3. The method of claim 1, further comprising:
if the requesting host server periodically retries access to the requested media element, and it is determined that the host server currently accessing the requested media element has not accessed the requested media element for a predetermined period, then a recovery operation is performed.

4. The method of claim 1, further comprising:
assigning a priority to each of the plurality of host servers, wherein if the requesting host server has a higher priority than the host server currently residing in the requesting system identifier field for the requested media element, an identifier associated with the requesting host server replaces an identifier associated with the host server currently residing in the requesting system identifier field of the of status information table.

5. A tangible, non-transitory computer readable medium containing a computer program product for sharing a plurality of media elements within a media library, the media library coupled to a plurality of host servers, the computer program product including instructions executed by the plurality of host servers and the media library to cause the plurality of host servers and the media library to perform:
establishing a storage area within the media library for maintaining server status information on each of the plurality of media elements via a status information table;
requesting access to a requested media element within the plurality of media elements in the media library via a requesting host server;
checking the status information table within the storage area to determine if the requesting host server has authority to immediately access the requested media element;
if the requesting host server has immediate access authority to access the requested media element, updating the status information table, then granting authority for the requesting host server to access the requested media element; and
if the requesting host server does not have immediate access authority to access the requested media element, updating the status information table, then periodically retrying access to the requested media element.

6. The computer program product of claim 1, further comprising:
establishing a cache data synchronization field within the storage area, the cache data synchronization field comprising a plurality of bits, each bit corresponding to a potential requesting host server;
if the requesting host server updates information that is potentially cached by any of the other potential requesting host servers, then setting the bit mask for any of the other potential requesting host servers within the cache data synchronization field indicating that any cached data is not synchronized; and
if any of the other potential requesting host servers refreshes any cached data, then resetting the bit corresponding to the any other potential requesting host server within the cache data synchronization field, indicating that the data is once again synchronized.

7. The computer program product of claim 5, further comprising:
if the requesting host server periodically retries access to the requested media element, and it is determined that the host server currently accessing the requested media element has not accessed the requested media element for a predetermined period, then a recovery operation is performed.

8. The computer program product of claim 5, further comprising:
assigning a priority to each of the plurality of host servers, wherein if the requesting host server has a higher priority than the host server currently residing in the requesting system identifier field for the requested media element, an identifier associated with the requesting host server replaces an identifier associated with the host server currently residing in the requesting system identifier field of the of status information table.

* * * * *